United States Patent [19]

Hirosawa et al.

[11] Patent Number: 4,809,163

[45] Date of Patent: Feb. 28, 1989

[54] COMPUTER SYSTEM WITH POWER CONTROL BASED ON THE OPERATIONAL STATUS OF TERMINALS

[75] Inventors: Toshio Hirosawa, Machida; Masaru Ohki, Kodaira; Yutaka Kuwahara, Hachioji, all of Japan

[73] Assignee: Hitachi, Ltd., Tokyo, Japan

[21] Appl. No.: 38,307

[22] Filed: Apr. 14, 1987

Related U.S. Application Data

[63] Continuation of Ser. No. 610,491, May 15, 1984, abandoned.

[30] Foreign Application Priority Data

May 18, 1983 [JP] Japan .................................. 58-86860

[51] Int. Cl.⁴ ...................... G06F 9/00; G06F 13/00; G06F 13/14; G06F 15/20
[52] U.S. Cl. ..................................... 364/200; 364/300
[58] Field of Search ................. 379/252, 234, 379, 22; 364/491, 492, 493, 700, 200 MS File, 300 MS File, 900 MS File

[56] References Cited

U.S. PATENT DOCUMENTS

| | | | |
|---|---|---|---|
| 4,051,326 | 9/1977 | Badagnani et al. | 364/900 |
| 4,181,950 | 1/1980 | Carter, II | 364/492 |
| 4,204,249 | 5/1980 | Dye et al. | 364/200 |
| 4,245,319 | 1/1981 | Hedges | 364/492 |
| 4,324,987 | 4/1982 | Sullivan, II et al. | 364/492 |
| 4,412,281 | 10/1983 | Works | 364/200 |
| 4,489,385 | 12/1984 | Miller et al. | 364/900 |
| 4,495,568 | 1/1985 | Gilbert et al. | 364/200 |
| 4,627,016 | 12/1986 | Kirschner et al. | 364/900 |
| 4,665,501 | 5/1987 | Saldin et al. | 364/900 |
| 4,718,007 | 1/1988 | Yukino | 364/200 |

*Primary Examiner*—Raulfe B. Zache
*Assistant Examiner*—Robert B. Harrell
*Attorney, Agent, or Firm*—Antonelli, Terry & Wands

[57] ABSTRACT

A computer system as a processor which operates under control of an operating system stored in memory to execute programs in response to commands received from operator terminals. Power is supplied to the processor from a power control circuit, and a terminal status-monitoring circuit operating under its own power supply monitors the operational status of the operator terminals and causes power to be supplied to the processor from the power control circuit when any one of the operator terminals has been turned on. When all of the operator terminals have been turned off, a command is sent to the processor from the power control circuit to initiate termination processing after which power supply is removed from the processor.

18 Claims, 9 Drawing Sheets

FIG. 6

| BIT POSITION | MEANING | VALUE |
|---|---|---|
| 0 | FLAG OF μ-CPU'S USING COMC | 0 : NOT USED<br>1 : USING |
| 1 | FLAG OF TIMING ACTION START DIRECTIVE | 0 : NOT USED<br>1 : START DIRECTIVE |
| 2 | FLAG OF WATCH'S USING COMC | 0 : NOT USED<br>1 : USING |
| 3 | TERMINAL NUMBER (0 – 31) | |
| 4 | | |
| 5 | | |
| 6 | | |
| 7 | | |

100 # COMPUTER SYSTEM WITH POWER CONTROL BASED ON THE OPERATIONAL STATUS OF TERMINALS

This is a continuation of application Ser. No. 610,491, filed May 15, 1984, now abandoned.

BACKGROUND OF THE INVENTION

1. Field of the Invention

The present invention relates to a computer system which automatically controls the on/off status of the power thereof and the start/stop of its operating system, by constantly monitoring the operational status of terminals.

2. Description of the Prior Art

In recent years, together with the development of the use of computer systems, the mode of using such computer systems has shifted from that concentrating on batch job processing to that concentrating on interactive processing using terminals, as exemplified by the TSS (Time-Sharing System). Especially in application fields in which computers are used for experimenting with and controlling instruments or the like (laboratory automation field), an experimenter will often conduct experiments and operate controls while conversing with a computer using terminals connected to the computer. In the field of laboratory automation (abbreviated hereinafter to "LA"), moreover, it is desirable that the researcher or experimenter be able to use the computer system as soon as an idea for an experiment occurs.

In order to satisfy that desire, it is necessary that the computer be capable of operating for 24 hour without interruption.

Usually, in LA using a computer system, a large computer and a minicomputer are hierachically connected so that large-scale data analysis is assigned to the larger computer, whereas the operation control and data gathering of experiment equipment are assigned to the smaller computer. Together with the improvement in processing capacity of minicomputers moreover, a method has been adopted in which a single minicomputer is shared by several experiment rooms and users, and is installed in a place remote from the experiment rooms. Of course all the operations in LA from the control of the experiment equipment to the data analysis may be performed by a large computer alone, without using a minicomputer.

As has been described above, it is desirable that an experimenter can promptly use a computer, even if it is midnight or a holiday, if he wants to. For this purpose, continuous 24-hour service is an essential condition for a computer system. When batch job processing and interactive processing such as TSS are combined, as in a large computer system, the continuous 24-hour service increases the utilization of the computer to a significant degree. However, if a computer assigned to experimental control alone is subjected to continuous 24-hour service, it is in operation even when it is not being used for experimental control. This reduces the utilization of the computer, and also wastes power.

If the computer operates only when it is required for controlling experiment equipment, on the other hand, the following problems arise: (i) an operator must be assigned to administer the operation of the system for each of several minicomputers and (ii) the experimenter must go to the remote place, in the absence of the operator, to start the supply of power to the computer system and initialize the system, or turn off the power supply and the system.

As a result of the increase in the necessity for continuous 24-hour service of computer systems, an automatic power on/off system has been proposed as one of the supports of an unsupervised computer system, in which the operation of the computer system is started or terminated at a predetermined time. However, this system is time-dependent, not user-dependent, so that the problem remains that the user is still inconvenienced.

SUMMARY OF THE INVENTION

It is, therefore, an object of the present invention to provide a user-dependent computer system which starts the power supply to the system when at least one of a group of terminal devices which can ask the computer processor for processing is activated, and terminates the power supply when all the terminal devices are inactivated.

In order to achieve this object, the computer system according to the present invention is characterized in that it monitors all the terminal devices which can request processing, and starts the power supply means when it detects the power-on status of at least one of these terminal devices, and terminates the power supply means when it detects the power-off status of all the terminal devices.

BRIEF DESCRIPTION OF THE DRAWINGS

Other objects, features and advantages of the present invention will become apparent from the following description taken in conjunction with the accompanying drawings, in which:

FIG. 6 is a table of the assignments of individual bits of the last byte on the address bus of FIG. 2;

DESCRIPTION OF PREFERRED EMBODIMENT

Figure 1:
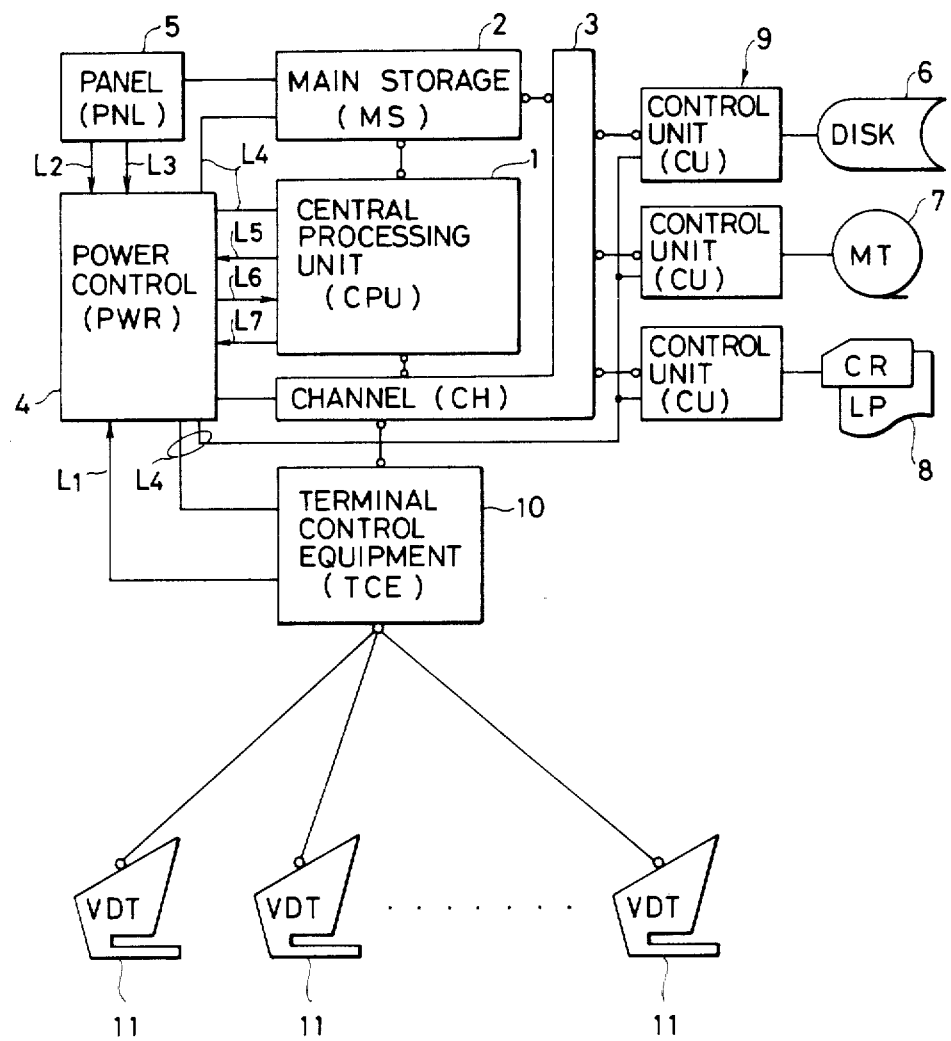
FIG. 1 is a block diagram of a terminal-oriented computer system according to one embodiment of the present invention.

FIG. 1 is a block diagram of a terminal-oriented computer system according to one embodiment of the present invention. Reference numeral 1 denotes a central processing unit (CPU), numeral 2 a main storage device (MS), numeral 3 a channel (CH), numeral 4 a power control unit (PWR), numeral 5 a panel (PNL), numeral 6 a disk storage unit (DISK), numeral 7 denotes a magnetic tape unit (MT), numeral 8 a unit record device including a card reader (CR) and a line printer (LP), numeral 9 an input/output control unit (CU), numeral 10 terminal control equipment (TCE), and numeral 11 a video data terminal (VDT).

The present invention is characterized in that the TCE 10 and the PWR 4 are provided with special control circuits.

Although only one TCE 10 is provided in FIG. 1, a plurality of TCEs may be connected to the CH 3.

The TCE 10 controls the several VDTs 11, and is provided with a special control circuit which is operated by a power supply separate from that of the main TCE 10, such as a battery, so that it monitors the usage status of the VDTs 11 at all times, using that special control circuit. If any one of the VDTs 11 is activated, e.g., if the power to a VDT 11 is turned on by the user, a corresponding signal is sent to the PWR 4 of the computer. PWR 4 turns on the power when it receives the status signal, to generate a trigger signal for starting the initialization of the operating system (OS), so that the computer system is started. As a result, the computer system can be used. After the computer system has operated, the special control circuit in the TCE 10 sends, when the power to all the VDTs 11 is turned off, a status signal to the PWR 4. As a result, the PWR 4 interrupts to the OS as an external interruption in the CPU 1 of the computer. The OS sends a power-off instruction to the PWR 4 when it detects the interruption, after it has conducted system termination processing, to cut the power-supply to the computer system. In short, the computer system is operated by the terminal orientation.

The special control circuits (the circuits monitoring the power on/off status of all the VDTs 11 connected to the TCE 10), which are built into the TCE 10 operate using a common internal data bus for the usual data send/receive operations within the TCE 10, and are driven by a power supply which is different from that of the circuits for the usual data send/receive operations.

Even if the power to all the VDTs 11 is turned off before or during initialization after the supply of power to the computer system has started, so that a status is produced in which the power supply to the computer system is to be cut, this termination is controlled so that it does not occur until after the completion of the initialization of the OS. On the other hand, if it is detected that the power to all the VDTs 11 is off, so that the termination processing of the OS is conducted to cut the power supply to the termination computer system, the report that the power is on is ignored until the processing of the OS and the processing interrupting the power supply to the computer system ends, even if it is detected that the power to one or more VDTs 11 is on so that power is supplied to the computer system.

The transmission and reception of signals between the individual components and the PWR 4 will be described in more detail in the following.

The TCE 10 always monitors the status of the group of VDTs 11, and the monitored result is reported over a signal line L1 to the PWR 4. If the power to one of the VDTs 11 being monitored by the TCE 10, e.g., the lefthand VDT 11, is turned on, the signal on the signal line L1 becomes "1", which is reported to the PWR 4. When there are a plurality of TCEs 10, incidentally, a logical or of the signals on the signal line L1, sent from the individual TCEs 10, is taken and the resultant output is reported to the PWR 4. A signal giving the current monitor mode is input to the PWR 4 over a signal line L2 from the PNL 5. The monitor mode is either a mode in which the computer operates while monitoring the terminal status (the signal on the signal line L2 is "1"), or a mode in which the computer operates while ignoring the terminal status (the signal on the signal line L2 is "0"). The designation of these modes is done by a node switch on the PNL 5, and is reflected by the signal on the signal line L2. A trigger signal for turning on and off the power to the PNL 5 is input over a group of signal lines L3 from the PNL 5 to the PWR 4. Power is supplied from the PWR 4 to the individual components over a line L4. A power supply termination, i.e., a request signal for turning off the power, is input from the CPU 1 to the PWR 4 over a signal line L5.

A signal line L6 transmits an initialization request signal from the PWR 4 to the CPU 1, and a signal line L7 transmits the information that the computer is in operation from the CPU 1 to the PWR 4.

When the mode of the computer is system such that it does not monitor the status of the VDTs 11, i.e., if the signal on the signal line L2 from the PNL 5 is at "0", the power supply to the computer system and the termination method by the PWR 4 is the same as that known in the prior art.

A method of controlling the power supply and the termination of the computer system when the mode is monitoring the status of the VDTs 11, i.e., when the signal on the signal line L2 from the PNL 5 is at "1", and a method of controlling the operation start and termination processing of the computer system are proposed by the present invention.

The special control circuits for monitoring the VDTs 11 are built into the TCE 10 and are operated by a stand-alone power supply such as a battery which is independent of the power supply of the TCE 10. If any one of the VDTs 11 is activated, the signal on the signal line L1 becomes "1", and this is reported to the PWR 4. The PWR 4 starts to supply power over the power supply line L4 to the individual components of the computer system when the mode signal supplied from the PNL 5 over the signal line L2 is at "1".

After the lapse of a predetermined period (usually after about one minute), a request for the loading of a microprogram and initialization by loading the OS into the MS 2 from the DISK 6 is made to the CPU 1 over the signal line group L6. The microprogram is loaded into the CPU 1 when the CPU 1 receives the request signal L6 from the PWR 4, and then the basic portion of the OS is loaded into the MS 2 from the DISK 6 and initialization is done with the program in the basic portion of the OS. The initialization of the OS means that the basic portion of the OS, when loaded into the MS 2, consecutively loads the program groups necessary for the OS operation into the MS 2, and then either sets a constant value or starts a TSS job and an on-line program and activates a job queue file. When the initialization of the OS is completed, the researcher or experimenter can freely use the computer system from any of the group of terminals VDT 11.

Interruptions to the computer system and the power supply are conducted in the following manner.

A monitor circuit built into the TCE 10 reduces the signal on the signal line L1 to "0" when it detects that all the VDTs 11 are not in use, i.e., that the power supply to all the terminals is off. The PWR 4 reports an external interruption signal indicating "system termination" to the CPU 1 by using one of the group of signal lines L6, after it has confirmed that the terminal monitor mode sent from the PNL 5 over the signal line L2 is "1".

When an external interruption signal is generated for the CPU 1, an external interruption program of the OS operates to identify that the reason for the external interruption is "system termination". Reason codes for external interruptions are stored in a predetermined storage area of the MS 2 by an external interruption circuit (not shown) of the CPU 1.

A system termination program of the OS thin operates to issue a "power-off request" command to the PWR 4 after the termination processing of the OS.

The termination processing of the OS is a reverse process to the initialization, and consists of the following specific processes: the termination of the TSS job, the termination of any on-line programs, the process of inactivating the job queue file, the termination of the accounting file gathered in the OS; the termination of any job being executed; and data storage for restart. The job queue file provides openings for receiving batch jobs, and for storing job numbers in the order they were received.

The execution of a "power-off request" command reports a signal indicating this request to the PWR 4 from the CPU 1 over the signal line L5. The PWR 4 starts a relay circuit of the power supply circuit to interrupt the power supply when it receives the power-off request.

The status of terminals remote from the computer system, as stated above, makes it possible to turn on or off the power supply to the computer system, and start or interrupt the OS operated by the computer system.

The operations of each of the terminal status monitor circuit in the TCE 10 and the control circuit in the PWR 4 will be described in the following.

Figure 2:
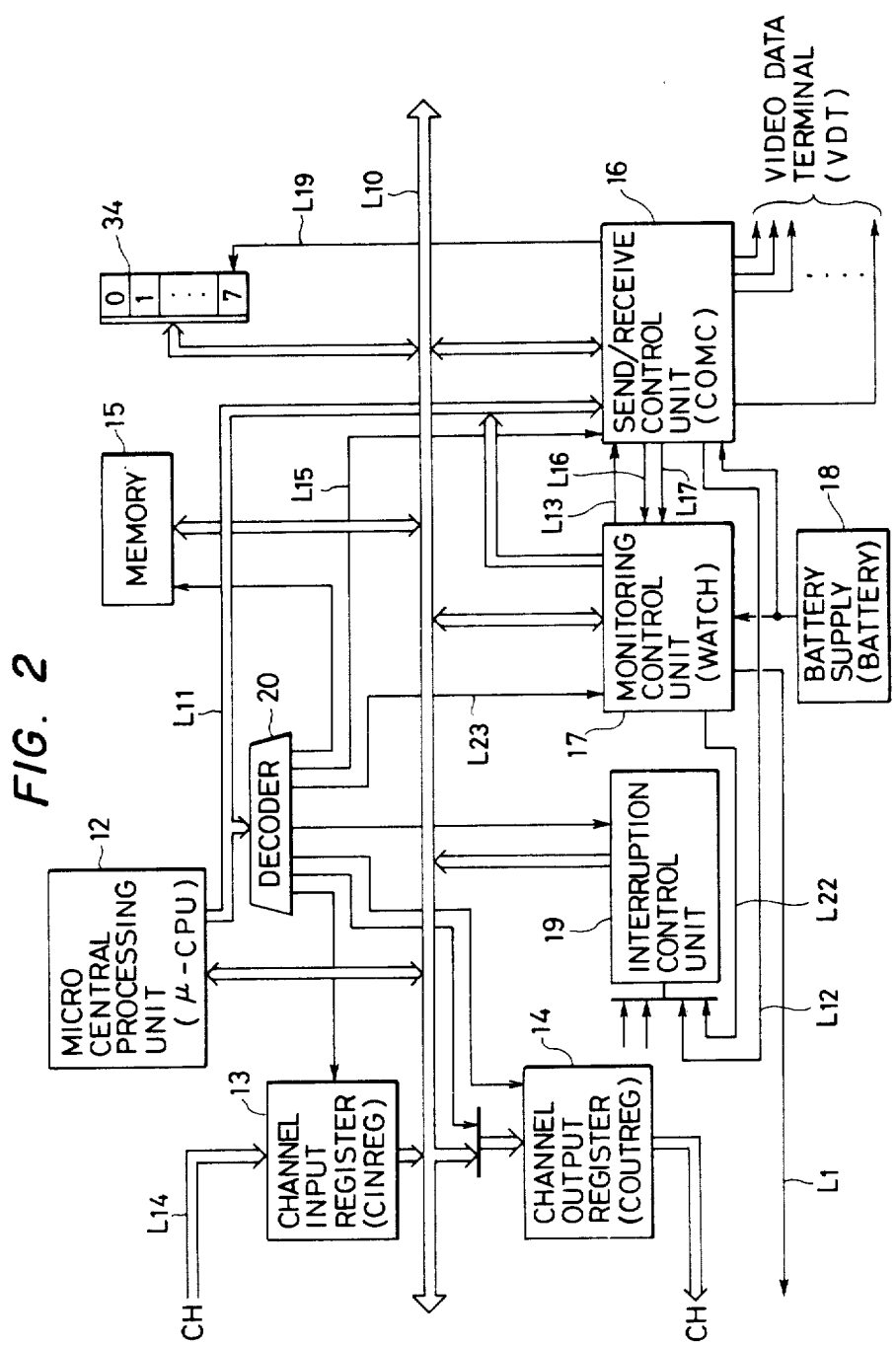
FIG. 2 is a block diagram of the interior of the terminal control equipment of FIG. 1.

FIG. 2 is a block diagram of the TCE 10. Reference numeral 12 denotes a micro central processing unit (μCPU) which is mounted in the TCE 10 to control the transmission and reception of data between the CH 3 and the VDTs 11 of FIG. 1. Numeral 13 denotes a channel input register (CINREG) which holds data sent out from the CH 3, numeral 14 denotes a channel output register (COUTREG) which holds data to be sent to the CH 3, numeral 15 denotes a memory (which is composed of a RAM), numeral 16 denotes a send/receive control unit (COMC) which sends and receives data to and from the VDTs 11, numeral 17 denotes a monitoring control unit (WATCH) which is added according to the present invention to monitor the status of the VDTs 11, numeral 18 is a battery (BATTERY) driving the COMC 16 and the WATCH 17, numeral 19 denotes an interruption control unit, and numeral 20 denotes a decoder which addresses each of the parts in the TCE 10, and which receives address data from an address bus L11 as an input. Data on the address bus L11 is also sent to the COMC 16. A data bus L10 is used in common for the usual operations of sending and receiving data, and also for the monitoring operation of the WATCH 17.

Figure 3:
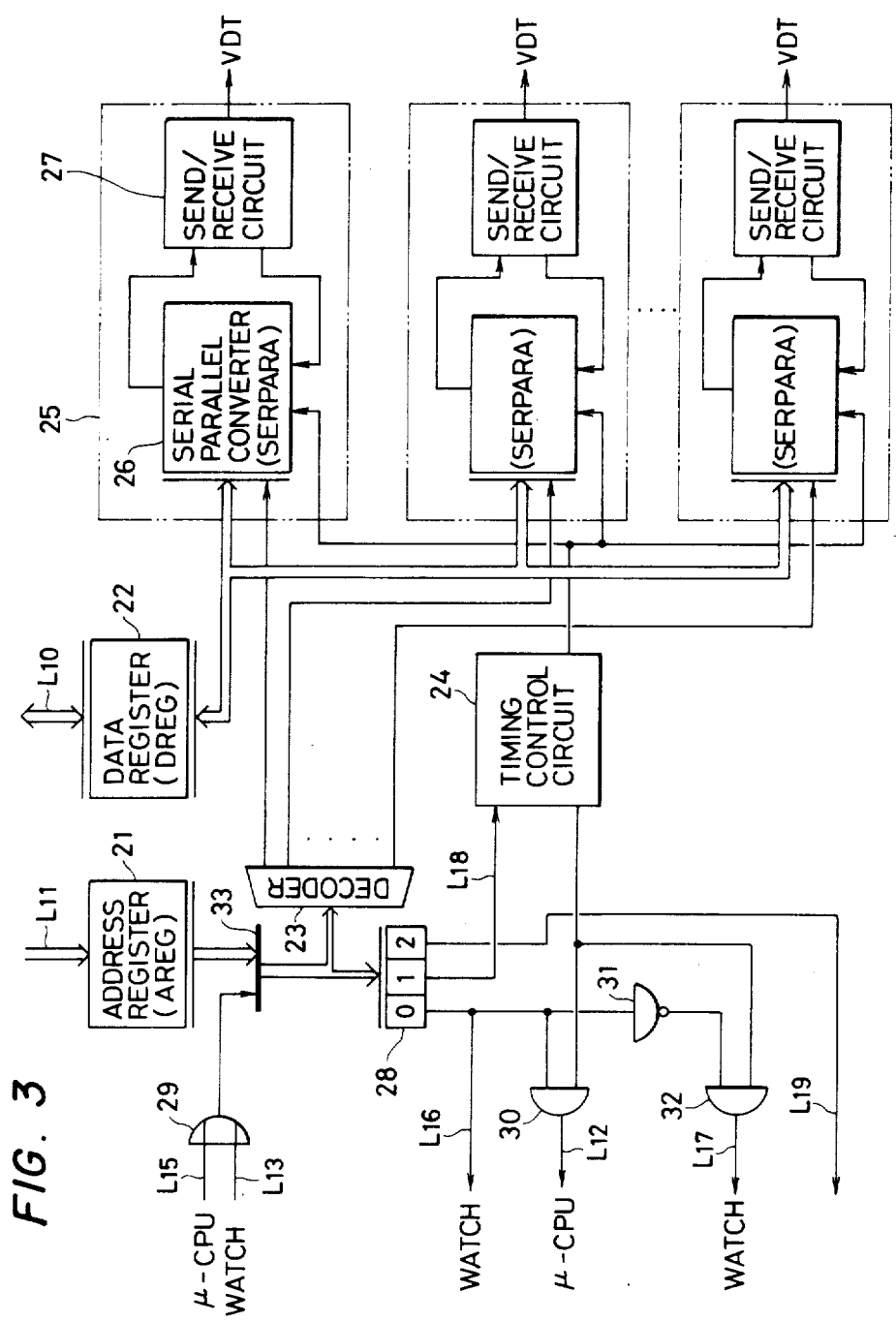
FIG. 3 is a block diagram of a send/receive control unit (COMC) controlling communications with the terminals of FIG. 2.
Figure 4:
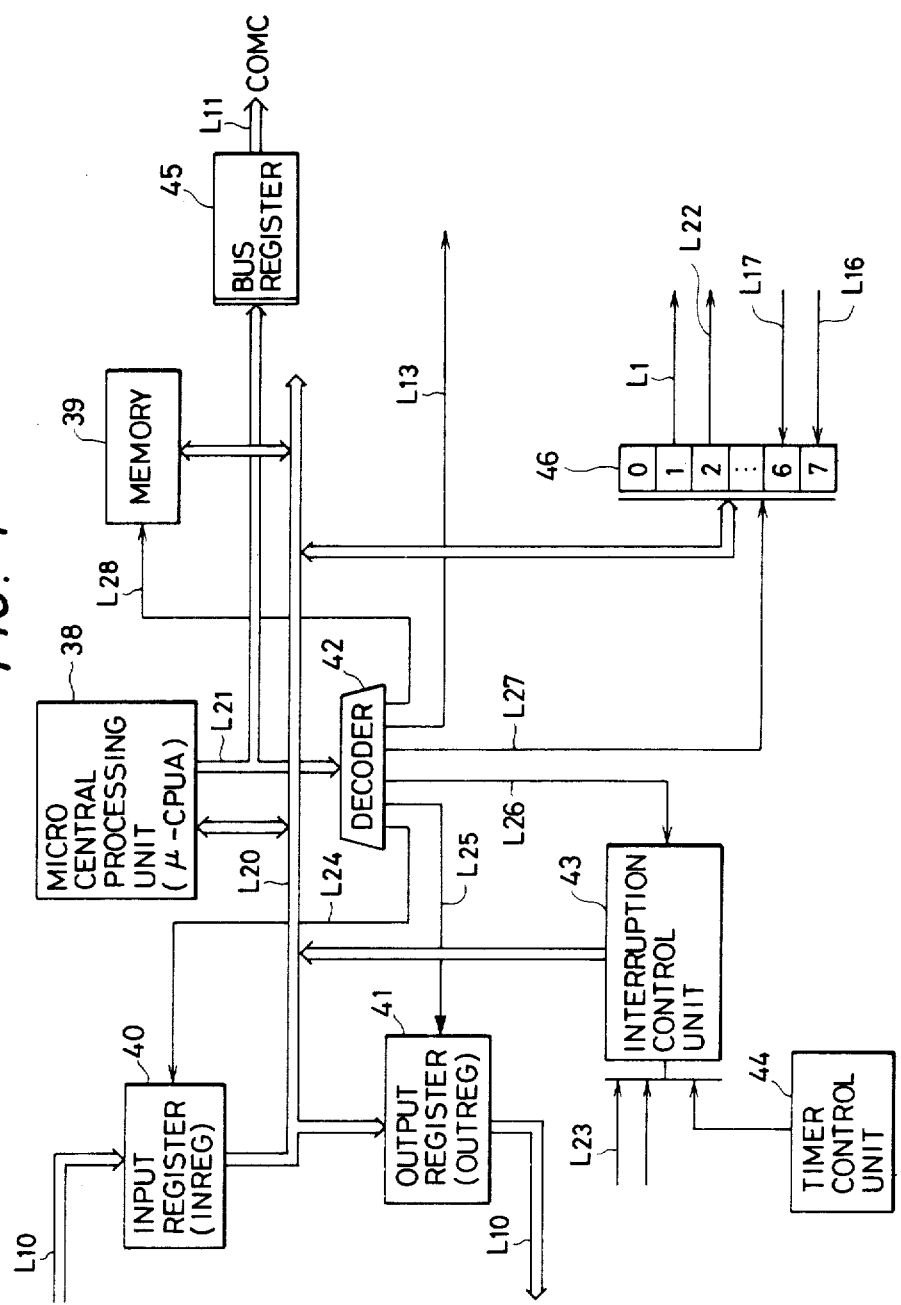
FIG. 4 is a block diagram of the monitoring control unit (WATCH) of FIG. 2.
Figure 5:
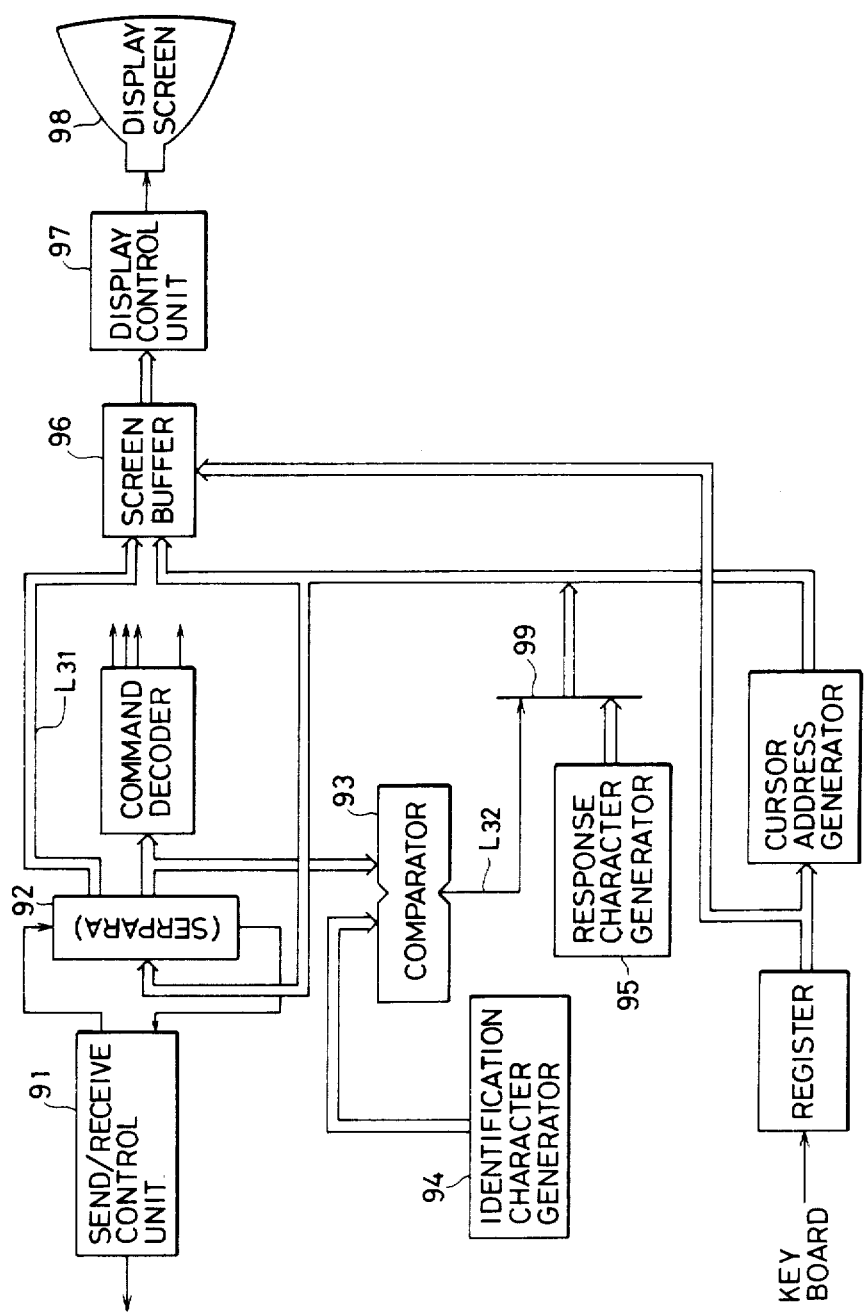
FIG. 5 is a block diagram of one of the terminals of FIG. 1.

FIG. 3 is a block diagram of the internal structure of the COMC 16 of FIG. 2, FIG. 4 is a block diagram of the internal structure of the WATCH 17 of FIG. 2, and FIG. 5 is a block diagram of the structure of one of the VDTs 11 connected to the TCE 10.

With reference to FIGS. 2 to 5, the usual data transmission and reception operations, and the operations of monitoring the power-on or power-off status of the VDTs 11 will be described in the following.

As shown in FIG. 2, when data is sent from the CH 3 to the VDTs 11 of the computer system, the data is received in the CINREG 13 over a data line L14. The data in the CINREG 13 is one byte long (or eight bits long) and is sequentially transferred to the memory 15 by the μCPU 12.

When the data transmission from the CH 3 ends, the μCPU sends a data train which has been temporarily stored in the memory 15 over the data bus L10 to the COMC 16. When data is being transmitted, a number is sent on the address bus L11 indicating which of the terminals VDT connected to the TCE 10 is the addressee.

The address bus is constructed so that it is two bytes long, for example, so that only the latter byte is sent to the COMC 16. The meanings of the individual bits of data within that one byte are tabulated in FIG. 6. More specifically bit position 0 corresponds to a flag showing that the μCPU 12 is using the COMC 16, and indicates whether or not the data bus L10, the address bus L11 and the COMC 16 are being used for transmitting and receiving data between the μCPU 12 and a VDT 11. Therefore, "1" means "in use" and "0" means "not used". As a result, this is at "1" when data is sent or received through the μCPU 12. Bit position 1 indicates the start of timing of the data transmission and reception signals, and bit positions 3 to 7 give the terminal number.

The COMC 16 sends a signal over a signal line L12 to the interruption control unit 19 to report that every byte length of data from the μCPU 12 is sent out sequentially bit-by-bit to the VDT 11. In response to this interruption, the μCPU 12 identifies that the one-byte data transmission has terminated, extracts the next data from the memory 15, and repeats these data-transmission operations.

In the COMC 16 of FIG. 3, reference numeral 21 denotes an address register (AREG), numeral 22 a data register (DREG), numeral 23 a decoder, numeral 24 a timing control circuit used when parallel data and serial data are converted, and numeral 25 denotes a send-/receive control unit. The send/receive control unit 25 is composed of serial/parallel converter 26 (SERPARA) which converts serial data to parallel data and vice versa, and a send/receive circuit 27 which transmits and receives the data for each bit, and controls the data transmission and reception operations with the VDTs 11. A maximum of thirty-two send/receive control units 25 can be provided, one for each of the VDTs 11.

Each terminal number is determined, as shown in FIG. 6, by the values of bit positions 3 to 7 within the byte, which are held in the AREG 21 of the COMC 16.

In FIG. 3 reference numeral 28 denotes a status register, numeral 29 an OR circuit, numerals 30 and 32 AND circuits, and numeral 33 a gate circuit.

In the TCE 10, the one-byte long data sent from the μCPU 12 is stored in the DREG 22 of the COMC 16 through the data bus L10. The operational status (i.e., bits 0 to 2) sent over the address bus L11 and the terminal number (bits 3 to 7) are held in the AREG 21. A maximum of 32 terminal numbers, e.g., 0 to 31, can be assigned with this system, but this can easily be increased by changing the number of bits. In response to an instruction from the μCPU 12, an action-start signal is sent over a signal line L15 to the OR circuit 29 to open the gate 33. Thus, one of the send/receive control units 25 is selected in accordance with the result obtained by the decoder 23. The data in the DREG 22 is transferred to the SERPARA 26 and is simultaneously set in the status register 28.

Bit position 0 in the status register 28 during normal data transmission and reception operations is "1", and bit position 1 is "1", as shown in FIG. 6. Next, the value of bit position 1 of the status register 28 is reported over a signal line L18 to the timing control circuit 24, which sends out timing signals at the same rate as the transmission speed of the transmission or reception of data to the SERPARA 26. The SERPARA 26 is composed of a shift register and data is sent therefrom bit-by-bit in response to the timing signals through the send/receive circuit 27 to the corresponding VDT 11. When the transmission terminates, a termination report is sent through the AND circuit 30 to the interruption control unit 19 of FIG. 2 over the signal line L12, until it reaches the μCPU 12. By repeating the operations described above, data is sent from the computer system through the TCE 10 to the VDT 11.

The normal data-reception operation will be described in the following. The description of how data (e.g., the terminal number) is sent over the address bus L11 by the μCPU 12 will not be repeated, because it is received by the same method as that of the data-transmission operation.

The data in one-bit units received from the VDTs 11 is stored in the serial/parallel converter (SERPARA) 26 via the send/receive circuit 27. The data in thin SERPARA 26 is the transferred to the DREG 22, and a signal is then sent to the μCPU 12 over the signal line L12. The μCPU 12 takes in the data on the data bus L10 in response to the signal on the signal line L12, and sequentially stores it in the memory 15 of FIG. 2. When the data reception from the VDT 11 terminates, the μCPU 12 then transmits the received data in the memory 15 to the computer system of FIG. 1 over the CH 3. More specifically, the μCPU 12 sequentially takes the data byte-by-byte from the memory 15 and sends it to the COUTREG 14 over the data bus L10. The addressing of the COUTREG 14 is done by the decoder 20. The CH 3 takes in the data received from the VDT 11 by removing the data held in the COUTREG 14, and sequentially stores the data in the MS 2 of the computer system.

The description thus far made is directed to the normal data transmission and reception operations of the TCE 10. WATCH 17 in the TCE 10 operates independently to monitor whether the power to the VDTs 11 is on or off. The monitoring of the VDTs 11 and the power supply, and the termination of the computer system by the WATCH 17 and the COMC 16 will now be described, including the processing done by the OS. The WATCH 17 and the COMC 16 are driven by a power supply system which is different from the circuit-driving power supply for the normal data transmission and reception operations of the TCE 10, which is the BATTERY 18. However, the COMC 16 can be driven by the power supplies of both systems.

The signal lines and circuits needed for monitoring the WATCH 17 are shown in FIGS. 2 and 4. A signal line L13 transmits a signal requesting a terminal status test from WATCH 17 to COMC 16, and a signal line L16 transmits a signal output from the status register 28 in the COMC 16 to the WATCH 17. When the signal on the signal line L6 is "1", it means that the μCPU 12 is using the data bus line L10. When the operation requesting WATCH 17 terminates, the signal on the signal line L7 becomes "1". The signal line L1 transmits to the PWR 4 of FIG. 1 whether the power of the group of VDTs 11 connected to the TCE 10 is on or off. When the signal on the signal line L1 is "1", it means that the power of at least one of the VDTs 11 is on. When that signal is "0", it means that the power to all the VDTs 11 is off. The address bus L11 is used in common with the μCPU 12.

In the WATCH 17, as shown in FIG. 4, a separate micro central processing unit (μCPUA) 38 provides control, independently of the μCPU 12 in the TCE 10. The WATCH 17 is driven by the battery supply (BATTERY) 18 of FIG. 2. Reference numeral 39 in FIG. 4 denotes a memory which holds the programs executed by the μCPUA 38, and a control block for monitoring the terminals which is addressed through a signal line L28. Numeral 40 denotes an input register (INREG) which is addressed by the μCPUA 38 and which is uniquely identified by an output signal line L24 from a decoder 42. Numeral 41 denotes an output register (OUTERG) which is identified by an output signal line L25. Numeral 43 denotes an interruption control unit of the μCPUA 38 which is addressed over a signal line L26, numeral 46 denotes a terminal status register which is addressed over a signal line L27, and numeral 44 denotes a timer control unit which generates an interruption in the μCPUA 38 in a predetermined cycle. The interruption-generating cycle can be freely set within a range of between 30 seconds to 20 minutes, for example. Reference characters L20 and L21 denote an internal data bus and an internal address bus. The internal address bus L21 is two bytes long for example, the last byte (bits 8 to 15) of which is held in a bus register 45, as in the normal data transmission and reception operations, and is then sent to the COMC 16 over the address bus L11. The meanings of the individual bit positions of the data in the address bus L11 are the same as those tabulated in FIG. 6.

Reports from the WATCH 17 to the μCPU 12 are done over a signal line L22. The level of the signal line L22 may be set by making bit 2 of the register 46 "1", as shown in FIG. 4. The addressing from the μCPU 12 to the WATCH 17 is done by setting a signal line L23 at "1" through the decoder 20 of FIG. 2.

The operations of monitoring the statuses of the VDTs 11 will now be described with reference to FIGS. 2 and 4.

The terminal-monitoring program effected by the μCPUA 38 of the WATCH 17 sets the timing of the monitoring cycle in the timer control unit 44. The timer control unit 44 starts, after a cycle has elapsed, an interruption in the μCPUA 38 to report that lapse of time. The μCPUA 38 then starts the terminal-monitoring process.

Figure 7:
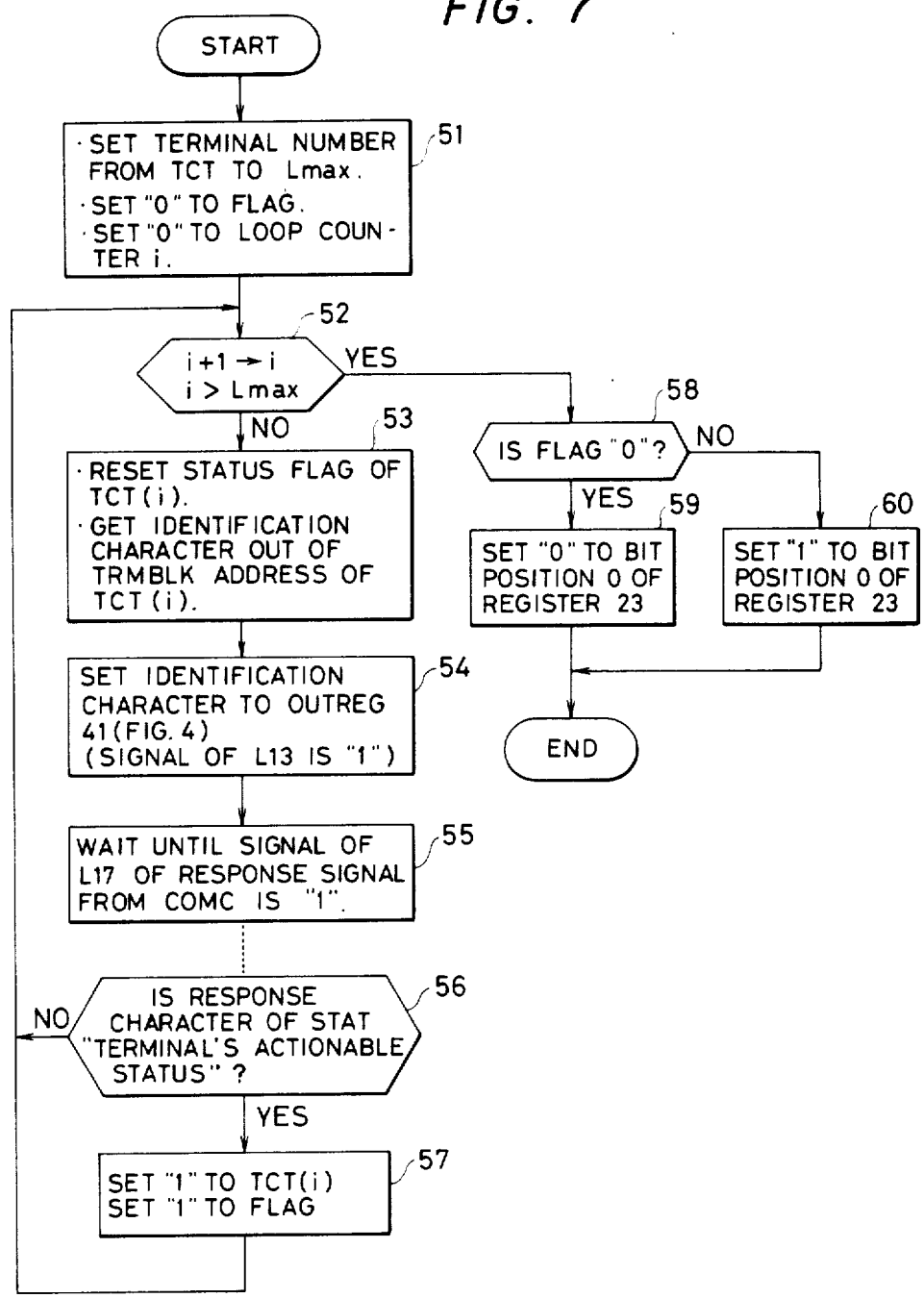
FIG. 7 is an operation flow chart of a terminal status-monitoring program.
Figure 8:
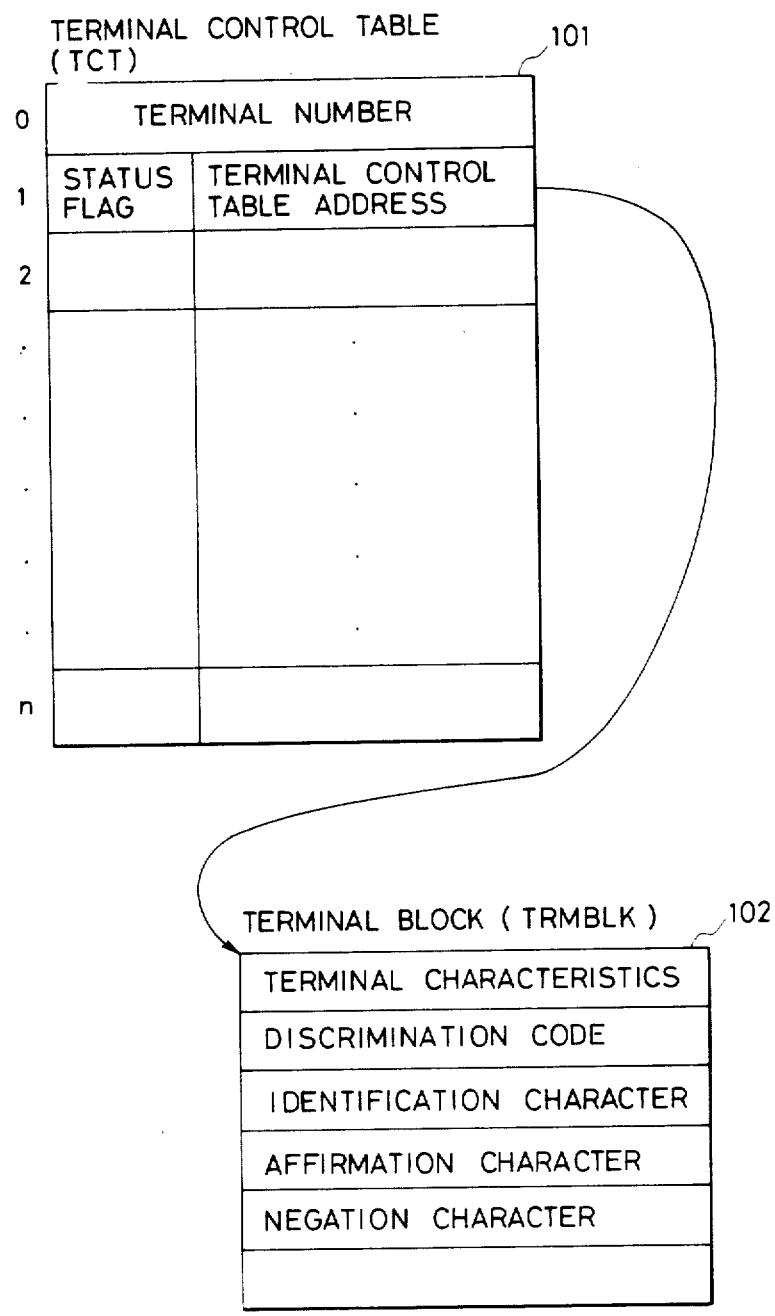
FIG. 8 is a table of the control blocks used by the terminal status-monitoring program.

FIG. 7 is a flow chart of the program executed by the μCPUA 38. FIG. 8 is a control block used by the processing program.

As shown in FIG. 7, the monitoring process is first initialized by a step 51. This initialization obtains the number of terminals connected, sets FLAG to "0", and sets an index (i) for testing a TCT table 101 of FIG. 8 to "0". In FIG. 7, FLAG is a working variable which is stored in the memory 39 and used by the μ CPUA 38.

The control block of FIG. 8 has a relationship such that a TRMBLK (terminal block) 102 for each terminal is pointed out from each entry in the TCT (terminal control table) 101. The first byte cf each entry in the TCT 101 is a status flag indicating the terminal status, i.e., the power-on/off status of the terminal. Each TRMBLK 102 holds the characteristics of the terminals, etc., and the data relating to the present invention are "identification characters". These "identification characters" are control characters for inquiring whether or not individual terminals VDTs 11 can be used, i.e., whether or not power to the terminal is turned on, and may differ according to the types or kinds of terminals.

Returning to FIG. 7, in a step 52, the index i is incremented by 1 and is compared with a value $L_{max}$, where $L_{max}$ indicates the number of terminals connected to the TCE 10. If the index i is less than or equal to $L_{max}$, a step 53 and subsequent steps are executed. In step 53, the "identification character" corresponding to a VDT 11 connected to the TCE 10 is obtained. In a step 54, the "identification character" obtained in step 53 is sent over the data bus L20 so that it can be sent to the COMC 16, and is held in the OUTREG 41. Since the data bus L10 is used in common by the $\mu$CPU 12 and the WATCH 17, as shown in FIG. 2, a process of claiming the right of using the data bus L10 is performed. The $\mu$CPUA 38 in the WATCH 17 first examines the register 46. Bit position 7 of the register 46 is the value of the signal sent from the COMC 16 over the signal line L16. When that value is "1", it means that the data bus L10 and the address bus L11 are being used for data transmission and reception by the $\mu$CPU 12 of the TCE 10. If it is "1", therefore, the system stands by without executing step 54 until that value changes to "0". During data transmission and reception by the $\mu$CPU 12 of FIG. 2, incidentally, the usage status of the common address bus L11 is examined before the $\mu$CPU 12 conducts data transmission or reception. This is because it is sufficient to examine bit position 7 of the register 34 of FIG. 2, since bit position 2 of the status register 28 of FIG. 3 is set over the signal line L19 in the register 34. If bit position 7 is at "1", it means that the WATCH 17 is being used. Therefore, the system waits until that value is "0".

In this way, the data bus L10 and the address bus L11 can be used in common.

Returning to FIGS. 4 and 7, in step 54, the desired terminal number is sent over the address bus L11. The terminal number is obtained by subtracting 1 from the value of the index i. Next, as shown in FIG. 6, the terminal number is set in bit positions 3 to 7 such that the value in bit position 0 is "0" and the values in bit positions 1 and 2 are "1". The one-byte long data is set in the latter byte of the two-byte long internal address bus L21, the first byte is used for addressing the individual circuits in the WATCH 17. Thus, the conditions in which the COMC 16 operates under the control of the WATCH 17 are prepared, so that the COMC 16 of FIG. 3 can start to operate by setting the value on the signal line L13 to "1". The operations of the COMC 16 are the same as the normal data transmission and reception operations, as described before. When the "identification character" is sent out bit-by-bit from the COMC 16 to the VDT 11, the VDT 11 conducts a comparison with its own "identification character".

FIG. 5 shows the processing circuit in the VDT 11 which is concerned with the present invention. Reference numeral 91 in FIG. 5 denotes a send/receive control unit used with the TCE 10, numeral 92 denotes a serial/parallel converter (SERPARA), numeral 93 a comparator, numeral 94 an identification character generator, numeral 95 a response character generator, numeral 96 a screen buffer, numeral 97 a display control unit, numeral 98 a display screen, numeral 99 a gate, and reference characters L31 denote an internal data bus.

The VDT 11 examines whether or not the character sent from the TCE 10 by the send/receive control unit 91 and the serial/parallel converter (SERPARA) 92 is identical to the "identification character" of that terminal, when it receives a character sent from the TCE 10. If the comparison result is identical an identity signal over a signal line L32 opens the gate 99, and a response character is returned over the data bus L31 through the serial/parallel converter (SERPARA) 92 to the TCE 10. As a result, in the present embodiment, no affirmative response character is returned if there is identity with the "identification character", but a negative response character may be returned to the TCE 10.

The COMC 16 sends and reports an operation termination signal over the signal line L17 when it receives a response character from a VDT 11. If no response character is sent from the VDTs 11, these operations are not performed.

The operations of steps 54 and 55 of FIG. 7 are those of each of the portions thus far described. Step 55 returns to step 52 if it is judged that the power to the terminal is off, when the signal on the signal line L17 does become "1" even after a wait of a predetermined time. More specifically, the $\mu$CPUA 38 of the WATCH 17 executes a judgement step 56 in which it judges whether or not the terminal is activated. This judgement can be made by comparing the "affirmative character" or "negative character" with the "response character" of the terminal, which are stored in the TRMBLK 102 of FIG. 8.

If the terminal is activated, the flag of the corresponding entry in the TCT 101 is set to "1", and FLAG is set to "1" by a step 57. FLAG is a working variable of the terminal monitoring program. If the value of the working variable is "0", it means that all the VDTs 11 connected to the TCE 10 are inactivated, i.e., that the power to the terminals is off. If FLAG is not "0", it means that at least one of the terminals is being used or is activated.

The terminal-monitoring program repeats the steps from the judgement step 52 to step 57 until the index i exceeds $L_{max}$. When the index i is greater than $L_{max}$, either a step 59 or a step 60 is executed, depending on a judgement step 58. Step 59 corresponds to the case in which all the terminal VDTs 11 connected to the TCE 10 are inactivated. In this case, the bit 0 of the register 46 of FIG. 4 is "0". As a result, the signal on the signal line L1 becomes "0", and this is reported to the PWR 4 of FIG. 1. On the other hand, step 60 corresponds to the case in which at least one of the terminals VDTs 11 connected to the TCE 10 is activated. In this case, bit 0 of the register 46 of FIG. 4 is "1". As a result, the signal on the signal line L1 becomes "1", and this is reported to the PWR 4 of FIG. 1. The addressing from the $\mu$CPUA 38 to the register 46 of FIG. 4 is conducted so that each of the portions of the WATCH 17 are addressed by the decoder 42 when the address preset by the $\mu$CPUA 38 is sent over the address bus L21. The setting of the data in the register 46 is done by sending the data over the data bus L20.

The operations thus far described terminate, the flow of the terminal-monitoring program started in each terminal-monitoring cycle, so that the statuses of the group of VDTs 11 connected to the TCE 10 can be sequentially reported to the PWR 4 of FIG. 1.

The operations when the PWR 4 receives a report on the statuses of the VDTs 11 from the TCE 10 over the signal line L1 will now be described.

Figure 9:
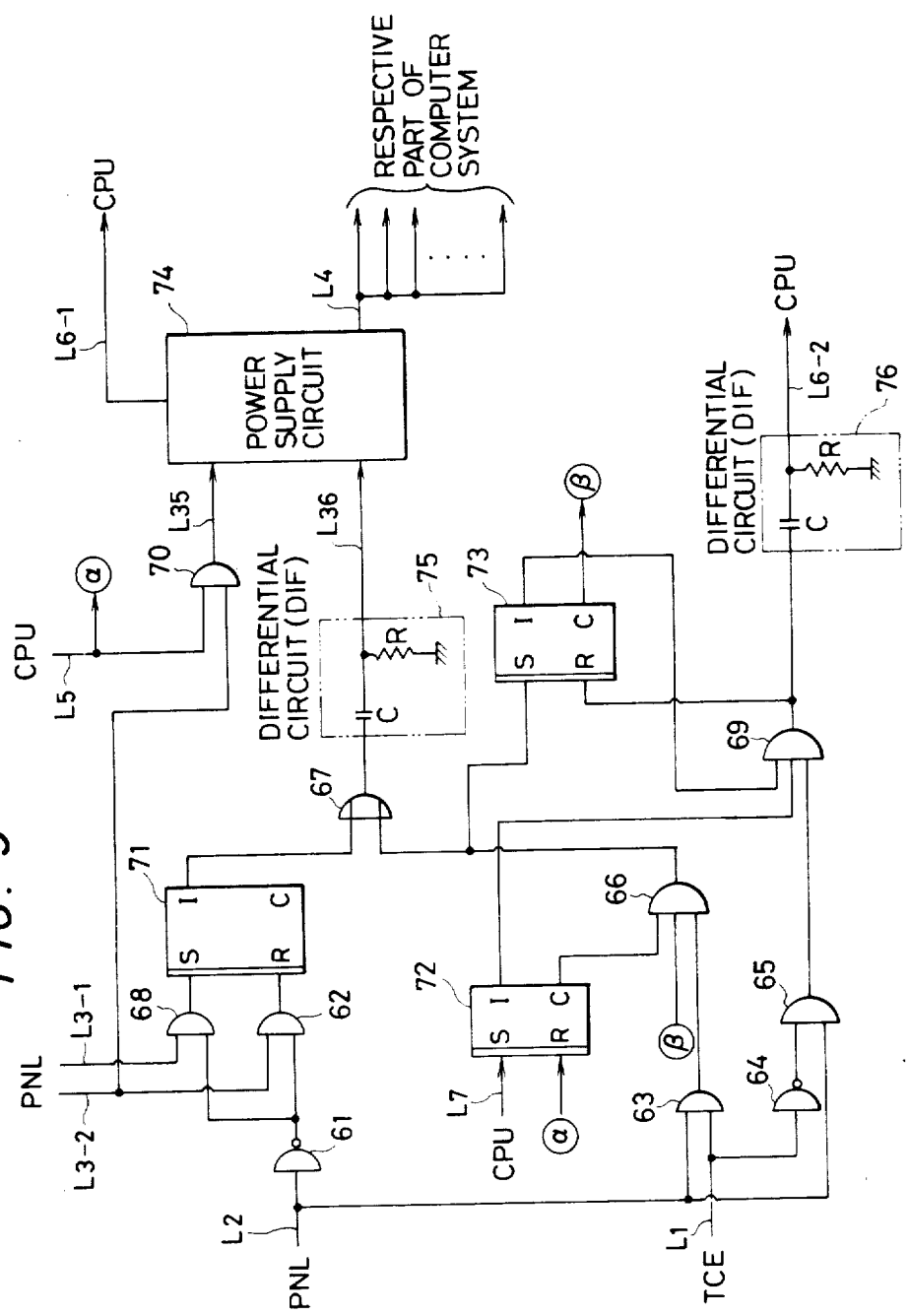
FIG. 9 is a block diagram of the power control unit of FIG. 1.

FIG. 9 is a diagram of the circuit in the PWR 4 which is concerned with the present invention.

The signal from the TCE 10 on the signal line L1 is input through gate circuits 63, 66 and 67 to a power supply circuit 74. The signal on the signal line L1 is a level signal, if it is at "1", as described above, it means that at least one of the group of terminals connected to the TCE 10 is activated. If the signal is "0", on the other hand, it means that all the terminals are inactivated, i.e., that the power to all the terminals is off.

Reference numerals 75 and 76 in FIG. 9 denote differential circuits (DIFs), numerals 71, 72 and 73 denote flip-flops, reference characters L35 denote a signal line for giving a signal requesting power-off to a power supply circuit 74, characters L36 denote a signal line for giving a signal requesting power-on to the power supply circuit 74, characters L6-1 denote a signal line for giving a signal requesting the loading of the microprogram and the initialization of the OS to the CPU 1, characters L6-2 denote a signal line for giving an external interruption signal indicating "system termination" to the CPU 1, characters L3-1 denote a signal line for giving a power-on signal when a power-on switch on the PNL 5 is pressed, and characters L3-2 denote a signal line for giving a signal requesting power-off when the power-on switch is released.

The operations of supplying power to the computer system, i.e., the power-on operations, will first be described in the following. The "monitor mode" signal sent from the PNL 5 over the signal line L2 is "1", so that the terminal status is monitored during the operation. When the signal on the signal line L2 is "0", incidentally, the mode of monitoring the terminal status is released, so that control of the power supply of the computer system is conducted by a conventional method.

When the signal on the signal line L1 from the TCE 10 is "1", the AND circuit 63 performs a logical AND with it and the signal on the signal line L2, and then the AND circuit 66 performs a logical AND with that result and the negative outputs from each of the flip-flops 72 and 73. The resultant is input to the OR circuit 67. The flip-flop 73 has the value "1" when power is supplied, and the value "0" when the conditions for cutting the power supply are present. The OR circuit 67 performs a logical OR between the resultant signal and the output of the flip-flop 71 and generates a "power-on request" signal to the power supply circuit 74. The flip-flop 71 is set when an AND circuit 68 performs a logical AND on signal on the signal line L3-1 which is "1", and the signal on the signal line L2, "0", which is inverted by an inverter 61, after the power-on switch of the PNL 5 has been pressed, and obtains the result "1". A signal output from the OR circuit 67 is input to the differential circuit 75. An output from the differential circuit 75 becomes a power-on request signal to the power supply circuit 74 over the signal line L36. Upon the reception of this signal, the power supply circuit 74 operates a relay circuit (not shown) to turn on the main power of the computer system, and then start the power supply to each of the portions in the computer system, over the power line L4. After the lapse of a predetermined time (which is usually: about one minute, but can be varied), the power; supply circuit 74 sends a signal to the CPU 1 over the signal line L6-1 requesting the loading of microprograms and initialization, by loading the OS into the MS 2 from the DISK 6.

The main items of the initialization of the OS are as follow: (i) the basic portion of the OS is loaded into the MS 2 by the DISK 6, (ii) the basic portion loads the group of programs necessary for the operation of the entire OS from the DISK 6 sequentially into the MS, (iii) values are set in the control table to enable running, (iv) TSS jobs and on-line programs are started, (v) a received job queue for running batch jobs is initialized, (vi) the running of the batch jobs is enabled, and (vii) a file in which is stored accounting data is activated.

When this initialization of the OS is terminated, the OS issues an instruction for turning on the flip-flop 72 for "running", which is transmitted from the CPU 1 over the signal line L7 to the PWR 4.

The PWR 4 turns on the flip-flop 72 to terminate the process, because the power to at least one of the VDTs 11 has been turned on, and this has been reported by the TCE 10 over the signal line L1.

It is necessary to provide a countermeasure to the situation in which the TCE 10 reports over the signal line L1, during the supply of power to the computer system and during the initialization of the OS, that power to all the terminals is off. This countermeasure is realized by the flip-flops 72 and 73 and the AND circuits 66 and 69. More specifically, the conditions for supplying power to the computer are: (i) the signal on the signal line L1 from the TCE 10 is "1", (ii) the value of the flip-flop 72 is "0", i.e., a "power-off request" had been issued in the past from the CPU 1, and (iii) the value of the flip-flop 73 is "0", i.e., "power-off conditions" had been present in the past.

As a result, even if it is reported over the signal line L1 that the power to all the terminals connected to the TCE is off, during the power supply process and during the OS initialization, the value of the flip-flop 72 is "0" so that the output from the AND circuit 69 is "0". As a result, the interruption signal for the CPU 1 is not reported over the signal line L6-2. If the power is forcibly cut after the end of initialization, moreover, the subsequent initialization is skipped.

While the computer system is operating, it is detected that the power to all the terminals is off, but the signal output from the AND circuit 69 is "1" so that the power is still supplied during the execution of the OS termination. If, during this time, it is reported that the power to at least of the terminals is turned on, (i.e., the signal on the signal line L1 becomes "1") , the negative output of (Ⓑ FIG. 9) of the flip-flop 73 is "1", but the value of the flip-flop 72 is set so that its negative output is "0". As a result, the output of the AND circuit 66 is "0". In other words, the report signal from the TCE 10 is ignored, so that the power supply circuit 74 is not operated.

The interruption of the computer system and the termination of the power supply will be described in the following.

The interruption of the computer system and the termination of the power supply based upon the operational statuses of the terminals are started when the signal on the signal line L2 from the PNL 5 is "1", and when the signal on the signal line L1 from the TCE 10 changes from "1" to "0". The signal on the signal line L1 becomes "0" only when the power to all the terminals connected to the TCE 10 is cut.

This condition is secured by an inverter 64 and an AND circuit 65. A signal output from the AND circuit 65 is supplied to the AND circuit 69 and the differential circuit 76, and issues an external interruption signal indicating "system termination" to the CPU 1 over the signal line L6-2.

The external interruption program of the OS executed by the CPU 1 executes the termination of the OS when it recognizes the request for "system termination". The OS termination process is executed by terminating any TSS on-line processing programs after all of the application programs executed by the CPU 1 are no longer being executed, by inactivating the accounting file, and by establishing a status in which nothing other than the OS can be performed by the CPU 1.

When the OS termination ends, the processing program issues a "power-off request" instruction to the CPU 1. The CPU 1 decodes that instruction and set the signal on the signal line L5 at "1" to request the PWR 4 to terminate the power supply in the power supply circuit 74. The PWR 4 generates a signal on the signal line L35 through an; OR circuit 70 to send the "power-off request" to the power supply circuit 74. At the same time, the value of the flip-flop 72 is reset to "0". The signal on the signal line L35 becomes "1" when the power-on switch of the PNL 5 is released, i.e., when the "power-off request" signal is input over the signal line L3-2 to the OR circuit 70.

The power supply circuit 74 operates the relay circuit (not shown) when it receives the signal on the signal line L35, to turn off the main power to the computer system.

As described before, according to the present invention, the status of whether or not power is supplied to the terminals connected to the computer system is monitored so that a trigger signal for automatically starting or terminating the power supply to the computer system, and the initialization or termination of the OS, is generated on the basis of the monitored result. Consequently, the computer system of the present invention does not require a special operator for operating and administering the computer system, and the users can use the system at any time. When the system is no longer in use, moreover, the power supply is automatically turned off to save power.

What is claimed is:

1. A computer system, comprising:
   a central computer which performs concurrently executing selected ones of plural programs;
   a plurality of operator terminal means connected to said computer for exchanging commands and data required to request said computer to execute a selected one of said plural programs between said computer and each terminal means so as to receive and output data corresponding to results of execution of the selected one of said plural programs;
   monitor means connected to said plurality of terminal means for detecting a first condition that at least one of the plurality of terminal means is in an operational status, and a second condition that all of the terminal means are in a non-operational status; and
   control means connected to said monitor means and said computer and responsive to detection of said first condition for starting supply of power to said computer to turn on said computer and for thereafter instructing said computer to execute initialization processing for an operating system program included in said computer, and responsive to the detection of said second condition for instructing said computer to execute termination processing for the operating system program and for thereafter terminating the supply of power to said computer so as to turn off the computer.

2. A computer system according to claim 1, where in said control means includes means connected to said monitor means and responsive to detection of the second condition after starting of power supply to said computer and before completion of execution of the initialization processing by said computer for instructing said computer to execute to execute the termination processing, after completion of the execution of the initialization processing by said computer.

3. A computer system according to claim 1, wherein said control means includes means connected to said monitor means and responsive to another detection of the first condition after detection of the second condition and before completing execution of the termination processing by said computer for instructing said computer to execute the initialization processing after completion of the termination processing 4. A computer system according to claim 1, wherein said control means includes means connected to said monitor means and responsive to detection of the second condition after starting of power supply to said computer and before completion of execution of the initialization processing by said computer for instructing said computer to execute the termination processing, after completion of the execution of the initialization processing by said computer and responsive to another detection of the first condition after detection of the second condition and before completing execution of the termination processing by said computer for instructing said computer to execute the initialization processing after completion of the termination processing.

5. A computer system according to claim 1, wherein said monitor means includes:
   a plurality of detect means, each corresponding to one of the plurality of terminal means, respectively, for detecting an operation status thereof and means connected to said plurality of detect means for detecting the first and second conditions in response to outputs of said plurality of detect means.

6. A computer system according to claim 5, wherein each detect means includes means connected to switch means provided in said corresponding terminal means for detecting the operation status thereof based on whether the switch means turns on or off, wherein said switch means is an operator power switch means for controlling power supply to said corresponding terminal means.

7. A computer system according to claim 6, wherein each terminal means comprises video data terminal means including keyboard means connected to a video display means.

8. A computer system according to claim 4, wherein said monitor means includes:
   a plurality of detect means, each for a corresponding one of the plurality of terminal means, for detecting an operational status of the correspond terminal means and means connected to said plurality of detect means for detecting the first and second conditions in response to outputs of said plurality of detect means.

9. A computer system according to claim 8, wherein each detect means includes means connected to switch means provided in said corresponding terminal means for detecting the operation status thereof based upon whether the switch means turns on or off, wherein said switch means is an operator power switch means for controlling power supply to said corresponding terminal means.

10. A computer system according to claim 9, wherein each terminal means comprises video data terminal means including keyboard means connected to a video display means.

11. A computer system, comprising:
a central computer which performs concurrently executing selected ones of plural programs;
power supply means connected to said central computer for supplying power thereto;
a plurality of operator terminal means connected to said central computer for exchanging commands and data between said central computer and each terminal means so as to request said central computer to execute selected ones of said plural programs and so as to receive and output data corresponding to results of execution of the selected ones of said plural programs;
monitor means connected to said plurality of terminal means for monitoring an on or off operational status of said plurality of terminal means; and
control means connected to said monitor means and said power supply means for instructing said power supply means to start a supply of power to said central computer to turn on said central computer when said monitor means detects that any one of said plurality of terminal means is put into said on operational status and for instructing said power supply means to terminate the supply of power to said central computer when the monitor means detects that none of said terminal means is in said on operational status; wherein said power supply means includes means connected to said control means and responsive to one command provided from said control means to effect starting of the supply of power for instructing said central computer to execute initialization processing for an operating system program include in said central computer after start of the supply of power, and responsive to another command provided from said control means to effect terminating of the supply of power instructing said central computer to execute termination processing for the operating system program before termination of the supply of power thereto.

12. A computer system according to claim 11, wherein each of said terminal means includes switch means to control said operational status, and said monitor means includes means for detecting whether or not said switch means provided in each of said plurality of terminal means is turned on in order to monitor the operational status of each terminal means.

13. A computer system according to claim 12, wherein said switch means comprises power switch means for controlling the supply of power to each terminal means from said power supply means.

14. A computer system according to claim 11, wherein said power supply means includes means connected to said control means and responsive to receipt of said another command to effect terminating of the supply of power after receipt of an instruction to effect starting of the supply of power and before completion of execution of the initialization processing by said central computer required by receipt of said one command to effect starting of the supply of power for providing said central computer with an instruction to effect execution of the termination processing, after completion of the execution of the initialization processing by said central computer.

15. A computer system according to claim 11, wherein said power supply means includes means connected to said control means and responsive to receipt of said one command from said control means to effect starting of the supply of power, after receipt of said another command to effect termination of the supply of power and before completion of executing the termination processing by said central computer required by receipt of said another command to effect termination of the supply of power, for providing said central computer with the command to effect execution of the initialization processing for the operating system program after completion of the termination processing by said central computer.

16. A computer system according to claim 1, wherein said control means includes a power supply means for supplying said power to said computer.

17. A method of automatically controlling on/off status of a main power supply to a central computer system including a plurality of terminal devices which can request processing, comprising the steps, performed entirely by a monitor circuit in computer system in an automatic manner of:
monitoring said plurality of term request processing;
detecting a power-on status of at least one of said plurality of terminal devices;
starting the power supply to said computer system in response to the detection of a power-on status of at least one of said plurality of terminal devices;
detecting a power-off status of all of said plurality of terminal devices;
terminating the power supply to all of said plurality of terminal devices in response to the detection of a power-off status of all of said plurality of terminal devices.

18. A method of automatically controlling on/off status of a main power supply to a central computer system including a plurality of terminal devices which can request processing, comprising the steps, performed entirely by a monitor circuit in said computer system in an automatic manner, of:
monitoring each of said plurality of terminal means
detecting a first condition that at least one of the plurality of terminal means is in an operational status;
starting a power supply to said computer in response to detection of said first condition;
instructing said computer to execute an initialization processing for an operating system program in said computer;
detecting a second condition that all of said plurality of terminal means are in a non-operational status;
instructing said computer to execute a termination processing for said operating system program in response to detection of said second condition;
terminating the power supply to said computer so as to turn off said computer after execution of said termination processing.

* * * * *